(12) United States Patent
McDiarmid et al.

(10) Patent No.: US 12,279,109 B2
(45) Date of Patent: Apr. 15, 2025

(54) WIRELESS NETWORK VERIFICATION USING FINGERPRINTS

(71) Applicant: T-Mobile USA, Inc., Bellevue, WA (US)

(72) Inventors: Mark McDiarmid, Seattle, WA (US); Andrew Lee Watts, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 599 days.

(21) Appl. No.: 17/078,063

(22) Filed: Oct. 22, 2020

(65) Prior Publication Data
US 2022/0132309 A1 Apr. 28, 2022

(51) Int. Cl.
| | |
|---|---|
| H04L 29/06 | (2006.01) |
| H04W 12/06 | (2021.01) |
| H04W 12/08 | (2021.01) |
| H04W 12/122 | (2021.01) |
| H04W 48/10 | (2009.01) |
| H04W 84/12 | (2009.01) |

(52) U.S. Cl.
CPC ........... *H04W 12/06* (2013.01); *H04W 12/08* (2013.01); *H04W 12/122* (2021.01); *H04W 48/10* (2013.01); *H04W 84/12* (2013.01)

(58) Field of Classification Search
CPC .... H04W 12/06; H04W 12/122; H04W 12/08
See application file for complete search history.

(56) References Cited

U.S. PATENT DOCUMENTS

| | | | |
|---|---|---|---|
| 2015/0350914 A1* | 12/2015 | Baxley | H04W 72/20 726/11 |
| 2017/0308683 A1* | 10/2017 | Bilobrov | G06F 21/10 |
| 2019/0306166 A1* | 10/2019 | Konda | H04W 12/069 |

* cited by examiner

*Primary Examiner* — Wasika Nipa
(74) *Attorney, Agent, or Firm* — Lee & Hayes, P.C.

(57) ABSTRACT

Systems, methods, and devices can be utilized to verify wireless local area networks (WLANs) using fingerprints. An example method includes identifying a received fingerprint comprised in an advertisement message that is received by a user equipment (UE) at a time and within a coverage area. A source of the advertisement message is determined to be a rogue WLAN by determining that the received fingerprint is different than a verified fingerprint transmitted by an authorized WLAN at the time and in the coverage area. The UE outputs an alert indicating the rogue WLAN.

15 Claims, 6 Drawing Sheets

WIRELESS NETWORK VERIFICATION USING FINGERPRINTS

BACKGROUND

The 3rd Generation Partnership Project (3GPP) has standardized various telecommunication systems. Modern terrestrial telecommunication systems include heterogeneous mixtures of 2nd, 3rd, and 4th generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Moving forward, future telecommunications systems may include 5th generation (5G) cellular-wireless access technologies to provide improved bandwidth and decreased response times to a multitude of devices that may be connected to a network.

In addition to 3GPP networks, the Institute of Electrical and Electronics Engineers (IEEE) has standardized other types of Wireless Local Area Networks (WLANs), such as in IEEE 802.11. Wi-Fi is an example of a type of WLAN that utilizes IEEE 802.11 protocols.

BRIEF DESCRIPTION OF THE DRAWINGS

The detailed description is set forth with reference to the accompanying figures.

FIG. 2A illustrates example signaling for verifying a wireless network. FIG. 2B illustrates example signaling for detecting an unauthorized wireless local area network (WLAN).

FIG. 3A illustrates a first example of an advertisement message, which may be a beacon. FIG. 3B illustrates a second example of an advertisement message, which may be a broadcast channel (BCH) message. FIG. 3C illustrates a third example of an advertisement message, which may be a downlink shared channel (DL-SCH) message.

DETAILED DESCRIPTION

Figure 1:
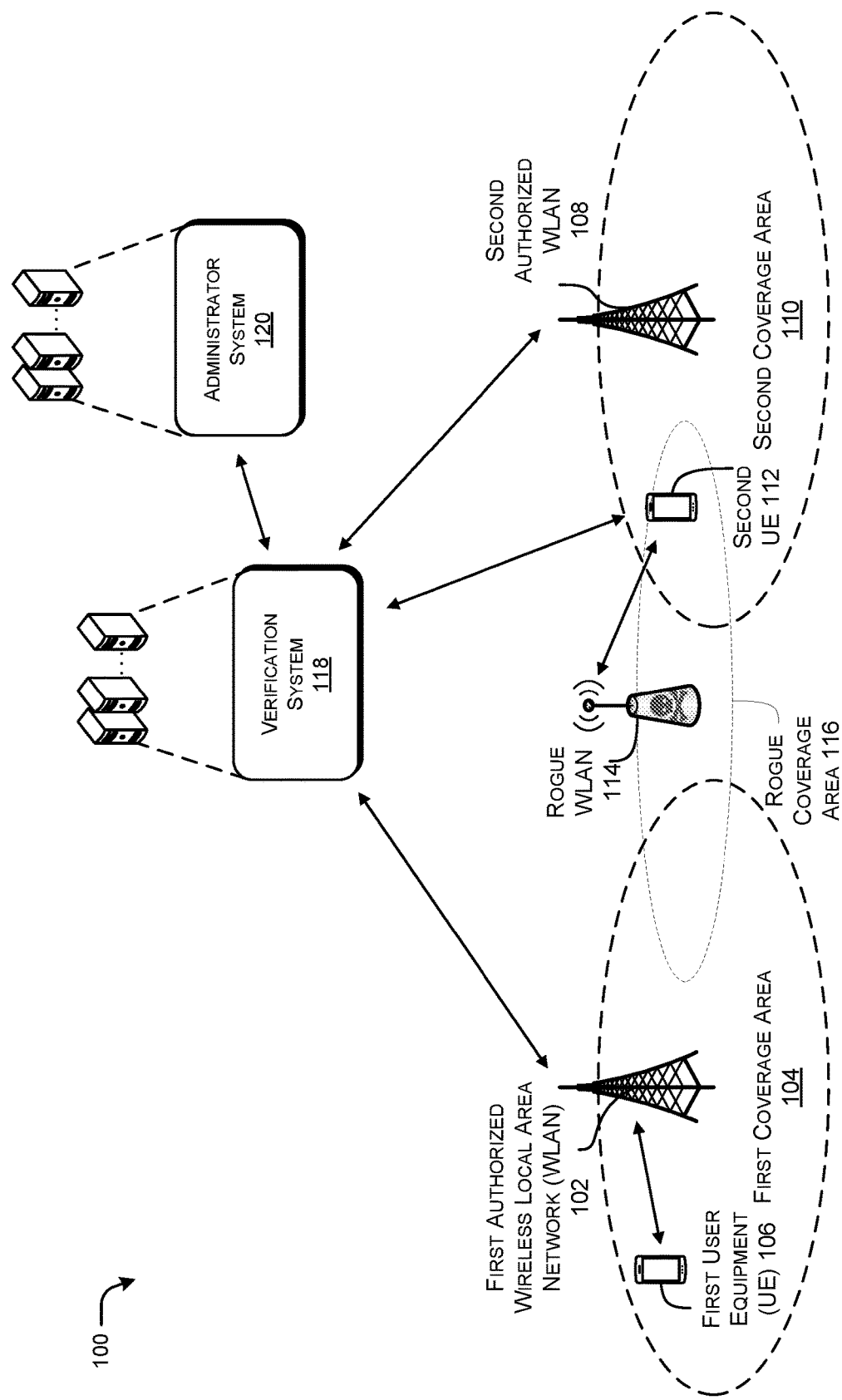
FIG. 1 illustrates an example network environment for wireless network verification.

The systems, devices, and techniques described herein relate to verifying wireless local area networks (WLANs) using fingerprints. Rogue WLANs, such as rogue base stations, stingrays, cell site simulators, international mobile subscriber identity (IMSI) catchers, and other unauthorized transmission devices, pose serious data security risks. A rogue WLAN can spoof an authorized WLAN and transmit advertisement messages throughout a coverage area of the authorized WLAN. Without having a mechanism to verify the source of the advertisement messages, user devices in the coverage area may connect to the rogue WLAN rather than the authorized WLAN. Once connected to the rogue WLAN, a user device may exchange data with the rogue WLAN. In some examples, the rogue WLAN may intercept the data, eavesdrop on the data, or insert malicious messages (e.g., phishing messages, or the like) into data traffic transmitted to the user device. In various cases, the rogue WLAN may compromise the security of data transmitted to and from the user device. The risks posed by rogue WLANs can be particularly concerning for users who exchange sensitive data using their devices. For example, rogue WLANs may pose a particular risk for governments communicating state secrets, businesses communicating trade secrets, or the like, over WLANs.

Furthermore, rogue WLANs create additional problems for mobile networks operating authorized WLANs. Rogue WLANs, for instance, can spoof authorized WLANs by using PLMN codes, base station identifiers, and other identifying information associated with the authorized WLANs. In some cases, this may enable the rogue WLANs to cause the mobile networks and/or customers of the mobile networks to be charged for activities by the rogue WLANs. Furthermore, the rogue WLANs may provide poorer quality services to the customers of the mobile networks than the services provided by the authorized WLANs, which can cause the mobile networks to lose customers over time. In addition, the rogue WLANs could utilize wireless resources that are otherwise reserved for the authorized WLANs. For instance, a mobile network associated with multiple authorized WLANs may have a license to utilize one or more bands of wireless spectrum in a geographic region. If a rogue WLAN uses the one or more bands to transmit and receive data wirelessly, the rogue WLAN can cause radio interference that interrupts the delivery of services by the mobile network. For these and other reasons, mobile networks have a need to identify and/or shut down rogue WLANs operating within their coverage areas.

In various implementations of the present disclosure, authorized WLANs include fingerprints within advertisement messages that are broadcast throughout their respective coverage areas. When a user device receives an advertisement message, the source of the advertisement message can be verified based on a fingerprint included in the advertisement message. Thus, the user device can identify whether the advertisement message originated from an authorized WLAN or a rogue WLAN spoofing the authorized WLAN. Further, when a source of an advertisement message is determined to be a rogue WLAN, a mobile network whose authorized WLAN the rogue WLAN is attempting to spoof can be notified. For instance, the mobile network may be notified of a coverage area and/or location in which the rogue WLAN is transmitting its advertisement messages. The mobile network may therefore take steps to neutralize the rogue WLAN and/or prevent the rogue WLAN from interrupting or compromising services of the mobile network.

Certain sophisticated rogue WLANs may learn (e.g., receive and copy) fingerprints included in advertisement messages broadcasted by authorized WLANs and impersonate the authorized WLANs by including the learned fingerprints in the advertisement messages of the rogue WLANs. To prevent the rogue WLANs from successfully copying verified fingerprints, an authorized WLAN may rotate fingerprints included in its advertisement messages over time. Further, authorized WLANs operating in different coverage areas may utilize different fingerprints at the same time. These and other techniques can prevent the rogue WLANs from successfully spoofing authorized WLANs for an extended period of time.

Various implementations of the present disclosure can be used to solve problems in the technical field of wireless communications. By identifying communications from rogue WLANs, user devices and mobile networks can prevent data traffic associated with the user devices from being compromised by nefarious entities associated with the rogue WLANs. Furthermore, mobile networks can prevent charges attributed to the mobile networks based on activities of the rogue WLANs. In addition, by identifying the locations of the rogue WLANs, mobile networks can effectively target and neutralize threats from rogue WLANs.

Various implementations of the present disclosure will now be described with reference to the accompanying figures. Like reference numerals may refer to like structures in the following description.

FIG. 1 illustrates an example network environment 100 for WLAN verification. In the network environment 100, a first authorized WLAN 102 can wirelessly communicate with any of a variety of devices in a first coverage area 104, such as a first user equipment (UE) 106. As used herein, the term "coverage area" can refer to a cell, in some cases. Similarly, a second authorized WLAN 108 can wirelessly communicate with any of a variety of devices in a second coverage area 110. A second UE 112 may be located in the second coverage area 110. As used herein, the terms "wireless local area network," "WLAN," "wireless access network," and their equivalents, can refer to one or more devices configured to exchange data wirelessly with one or more additional devices located in a coverage area. In examples of cellular networks, a WLAN may include a radio access network (RAN) and/or a base station. In examples of IEEE networks, a WLAN may include an access point (AP).

In various implementations, the first authorized WLAN 102 and/or second authorized WLAN 108 may include device(s) configured to schedule wireless resources for uplink and downlink communications within the first coverage area 104. In some instances, the first authorized WLAN 102 and/or second authorized WLAN 108 can utilize wireless resources specified in the 5G New Radio (NR) standard, as defined by 3GPP. In certain implementations, the first authorized WLAN 102 and/or second authorized WLAN 108 can transmit and receive communications over frequency resources including "millimeter wave" bands including, but not limited to 26 GHz, 28 GHz, 39 GHz, 60 GHz, and the like. The first authorized WLAN 102 and/or second authorized WLAN 108 may utilize frequency resources in the Citizen Broadband Radio Service (CBRS), such as a 3.5 GHz band. In some embodiments, the first authorized WLAN 102 and/or second authorized WLAN 108 can be, or at least include a gNodeB. In some embodiments, the first authorized WLAN 102 and/or the second authorized WLAN 108 can be part of a non-standalone (NSA) architecture and/or a standalone (SA) architecture. In an NSA architecture, the first authorized WLAN 102 and/or the second authorized WLAN 108 may coordinate with an eNodeB and/or may relay services between devices and an LTE core network (e.g., an Evolved Packet Core (EPC)). In an SA architecture, the base station 102 may relay services between devices in the cell 104 and a 5G core network (5GC).

In various examples, the first authorized WLAN 102 and/or second authorized WLAN 108 can utilize wireless resources specified in other 3GPP standards, such as wireless resources specified in the 4G Long Term Evolution (LTE) standard. For example, the first authorized WLAN 102 and/or the second authorized WLAN 108 may utilize a wireless band including frequency resources in at least one of an LTE band 71 (e.g., a 600 MHz band), an LTE Band 48 (e.g., 3500 MHz), and the like. In some instances, the frequency resources can include, but are not limited to, LTE Band 1 (e.g., 2100 MHz), LTE Band 2 (1900 MHz), LTE Band 3 (1800 MHz), LTE Band 4 (1700 MHz), LTE Band 5 (850 MHz), LTE Band 7 (2600 MHz), LTE Band 8 (900 MHz), LTE Band 20 (800 MHz GHz), LTE Band 28 (700 MHz), LTE Band 38 (2600 MHz), LTE Band 41 (2500 MHz), LTE Band 50 (1500 MHz), LTE Band 51 (1500 MHz), LTE Band 66 (1700 MHz), LTE Band 70 (2000 MHz), and LTE Band 74 (1500 MHz). For instance, the first authorized WLAN 102 and/or second authorized WLAN 108 can be, or at least include an eNodeB.

In some implementations, the first authorized WLAN 102 and/or second authorized WLAN 108 can be or include an access point (AP) that utilizes wireless resources specified in the IEEE 802.11 standard. In particular examples, the first authorized WLAN 102 and/or second authorized WLAN 108 can transmit and receive communications over frequency resources including at least one of a 900 MHz band, a 2.4 GHz band, a 3.6 GHz band, a 4.9 GHz band, a 5 GHz band, a 5.9 GHz band, or a 60 GHz band.

In various examples, the first authorized WLAN 102 and/or the second authorized WLAN 108 can be or include a Long Range (LoRa) transceiver. In some cases, the first authorized WLAN 102 and/or the second authorized WLAN 108 can transmit and receive communications in a 433 MHz band, an 686 MHz band, a 915 MHz band, a 923 MHz band, or the like.

Although not illustrated in FIG. 1, in some instances, the first WLAN 102 and/or the second authorized WLAN 108 may relay communications between an external network (e.g., a core network) and the devices located in the first coverage area 104 and/or the second coverage area 110. A core network, for example, can provide services to one or more devices located in the first coverage area 104 and/or the second coverage area 110 via the first authorized WLAN 102 and/or the second authorized WLAN 108 from the Internet. Examples of core networks include, for instance, an Evolved Packet Core (EPC), an 5G Core (5GC), or the like. In some cases, the first authorized WLAN 102 and/or the second authorized WLAN 108 may be connected directly to the Internet or some other wide area network (WAN) and relay data between the Internet and a connected device.

In some instances, the core network includes, or is connected to, an IP Multimedia Subsystem (IMS) core (sometimes referred to as an "IMS core network," an "IMS network," or an "IM Subsystem"). IMS is an architectural framework defined by 3GPP for delivering Internet Protocol (IP) multimedia to a device, such as a UE. The IMS core can be maintained and/or operated by one or more service providers, such as one or more wireless carriers ("carriers"), that provide IMS-based services to a user who is associated with the device. For example, a service provider can offer multimedia telephony services that allow a user to call or message other users via the IMS core using his/her device. A user can also utilize an associated device to receive, provide, or otherwise interact with various different IMS-based services by accessing the IMS core. It is to be appreciated that any number of base stations, such as base station 102, and/or IMS nodes can be associated with the IMS network.

An operator of the IMS core can offer any type of IMS-based service, such as, telephony services, emergency services (e.g., Enhanced 911 (E911)), gaming services, instant messaging services, presence services, video conferencing services, social networking and sharing services, location-based services, push-to-talk services, and so on. In order to access these services (e.g., telephony services), a device is configured to request establishment of a communication session with one or more devices, such as the first UE 106, located in the first coverage area 104. In the case of telephony services, the communication session can comprise a call (e.g., a voice-based communication session, such as a Voice Over LTE (VoLTE) call, or a Wi-Fi call). In the case of data services, the communication session can include a data session.

The first coverage area 104 may be a geographic region in which the first authorized WLAN 102 can transmit and/or receive wireless communications. Similarly, the second coverage area 110 may be a geographic region in which the second authorized WLAN 108 can transmit and/or receive wireless communications. One or more devices, including the first UE 106, may be configured to transmit and/or receive wireless communications with the first authorized WLAN 102 may be located in the first coverage area 104. One or more devices, including the second UE 108, may be configured to transmit and/or receive wireless communications may be located in the second coverage area 110. The devices, including the first UE 106 and/or the second UE 112, may be any form of devices capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), LTE, Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), CBRS, and/or any future IP-based network technology or evolution of an existing IP-based network technology. Examples of these devices can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of devices include, but are not limited to, smart devices such as televisions, refrigerators, washing machines, dryers, smart mirrors, coffee machines, lights, lamps, temperature sensors, leak sensors, water sensors, electricity meters, parking sensors, music players, headphones, or any other electronic appliances that can generate, request, receive, transmit, or exchange voice, video, and/or digital data over a network.

In various implementations of the present disclosure, the first authorized WLAN 102 may establish a connection with one or more devices (e.g., the first UE 106) in the first coverage area 104 by broadcasting an advertisement message throughout the first coverage area 104. Similarly, the second authorized WLAN 108 may establish a connection with one or more devices (e.g., the second UE 112) in the second coverage area 110 by broadcasting an advertisement message throughout the second coverage area 110. As used herein, the terms "advertisement message," "advertisement," and their equivalents, can refer to a wireless broadcast message transmitted by a source that, when received by a destination, enables the destination to establish a wireless connection with the source. Examples of advertisements include beacon messages, system information block (SIB) messages, master information block (SIB) messages, system information broadcast messages, or the like. An advertisement message can encode various control plane data, such as identifier data (e.g., a service set identifier (SSID), a base station identity code (B SIC), etc.) identifying the source of the advertisement message, timing data (e.g., timestamps) that enables synchronization between the source and the destination, capability data indicating capabilities of the source, or the like. In some cases, advertisements are transmitted periodically by WLANs, such as the first authorized WLAN 102 and/or the second authorized WLAN 108. Accordingly, devices that enter the first coverage area 104 and/or the second coverage area 110 may establish connections with the first authorized WLAN 102 and/or the second authorized WLAN 108. Once a connection is established between a WLAN (e.g., the first authorized WLAN 102 or the second authorized WLAN 108) and a device (e.g., the first UE 106 or the second UE 112), the WLAN and the device can coordinate timing and/or frequency channels for the wireless transmission of uplink and downlink data. A device connected to a WLAN may exchange (e.g., receive and/or transmit) data wirelessly with the WLAN.

In various implementations of the present disclosure, a rogue WLAN 114 may be located in proximity to the first authorized WLAN 102 and the second authorized WLAN 108. The rogue WLAN 114 may be also broadcast advertisement messages and may establish connections with one or more devices within a rogue coverage area 116. However, the rogue WLAN 114 may be problematic. For instance, the rogue WLAN 114 may snoop on (e.g., intercept, process, store, forward to an unauthorized entity, or the like) data traffic that it relays from user devices. In some cases, the rogue WLAN 114 may spoof PLMN codes associated with carrier networks that do not control the rogue WLAN 114. In various examples, the rogue WLAN 114 may include the same or similar frequency resources as the first authorized WLAN 102 and/or the second authorized WLAN 108, thereby causing radio interference with communications to and from the first authorized WLAN 102 and the second authorized WLAN 108.

A verification system 118 may be configured to verify advertisement messages received by devices in the environment 100, such as advertisement messages received by the first UE 106 and the second UE 112. The verification system 118 may be able to distinguish between advertisement messages that are transmitted from authorized WLANs (e.g., the first authorized WLAN 102 or second authorized WLAN 108) and advertisement messages transmitted from unauthorized WLANs, such as the rogue WLAN 114. The verification system 118 may include one or more devices (e.g., servers) that are in communication with the first UE 106 and/or the second UE 112 via one or more intermediary communication networks. In some cases, the verification system 118 may be included within the first UE 106 or the second UE 112.

In various implementations, the verification system 118 may distinguish between the sources of the advertisement messages based on fingerprints included within the advertisement messages. As used herein, the term "fingerprint," and its equivalents, may refer to any customizable data pattern or data field within an advertisement message. In some cases, a fingerprint can be represented by one or more symbols. For instance, a fingerprint may be defined by a string, a number, or some other data type. In some cases, a fingerprint can be included in a header and/or a payload of a data packet.

In some cases, the verification system 118 may identify one or more first verified fingerprints that the first authorized WLAN 102 includes in first advertisement messages transmitted throughout the first coverage area 104. The verification system 118 may further identify one or more second verified fingerprints that the second authorized WLAN 108 includes in second advertisement messages transmitted throughout the second coverage area 110. Further, the verification system 118 may identify a first received fingerprint in an advertisement message received by the first UE 106 in the first coverage area 104 or a second received fingerprint in an advertisement message received by the second UE 108 in the second coverage area 110. If the verification system 118 determines that the first received fingerprint matches the one or more first verified fingerprints, then the verification system 118 may conclude that the source of the first received fingerprint is the first authorized WLAN 102, rather than the rogue WLAN 116. However, if the first fingerprint is different than the one or more first verified fingerprints, then the verification system 118 may conclude that the source of the first received fingerprint is the rogue WLAN 116, rather than the first authorized WLAN 102. Similarly, if the verification system 118 determines that the second received fingerprint matches the one or more second verified fingerprints, then the verification system 118 may conclude that the source of the first received fingerprints is the second authorized WLAN 108, rather than the rogue WLAN 116. However, if the second fingerprint is different than the one or more second verified fingerprints, then the verification system 118 may conclude that the source of the second received fingerprint is the rogue WLAN 116.

In some implementations, the verified fingerprints transmitted by the first authorized WLAN 102 and the second authorized WLAN 108 may be rotated fingerprints. As used herein, the term "rotated fingerprint" may refer to any fingerprint that changes over time. For example, each one of the first authorized WLAN 102 or the second authorized WLAN 108 may change its respective fingerprint periodically (e.g., once an hour, once every 8 hours, once a day, or at some other frequency). In some cases, each of the first authorized WLAN 102 and the second authorized WLAN 108 may change their respective fingerprints at different (e.g., random) time intervals. According to some cases, the first authorized WLAN 102 and the second authorized WLAN 108 may change their fingerprints more frequently during time intervals with high data traffic (e.g., when the amount of data traversing the WLANs exceeds a threshold, during a time-of-day, such as between 7 PM and 10 PM, in which data traffic regularly peaks, or the like). In various implementations, the verification system 118 may identify a time at which a user device (e.g., the first UE 106 or the second UE 112) receives a fingerprint from an unknown source. The verification system 118 may determine whether the source is the rogue WLAN 114 by comparing the received fingerprint with a first fingerprint that the first authorized WLAN 102 transmits during the time and/or a second fingerprint that the second authorized WLAN 108 transmits during the time.

In some cases, the one or more first fingerprints transmitted by the first authorized WLAN 102 may be different than the one or more second fingerprints transmitted by the second authorized WLAN 108. For example, a first fingerprint that the first authorized WLAN 102 transmits at a particular time (e.g., within a particular time period) may be different than a second fingerprint that the second authorized WLAN 108 transmits at the particular time. According to various implementations, the verification system 118 may identify the location of a user device (e.g., the first UE 106 or the second UE 112) and use the location to determine whether the user device is located in the first coverage area 104 of the first authorized WLAN 102 or the second coverage area 110 of the second authorized WLAN 108. For example, the user device may identify its location using a Global Positioning Service (GPS) system and report its location to the verification system 118. The verification system may compare the location of the user device to a map of coverage areas (e.g., a map of the first coverage area 104 and the second coverage area 110). If the verification system 118 determines that the user device is located in the first coverage area 104, then the verification system 118 may compare the fingerprint received by the user device to the first fingerprint that is transmitted by the first authorized WLAN 102. If the verification system 118 determines that the user device is located in the second coverage area 110, then the verification system 118 may compare the fingerprint received by the user device to the second fingerprint that is transmitted by the second authorized WLAN 108. Thus, the verification system 118 may be prevented from misidentifying the first authorized WLAN 102 or the second authorized WLAN 108 as the rogue WLAN 114.

In some implementations, the first fingerprint(s) transmitted by the first authorized WLAN 102 and the second fingerprint(s) transmitted by the second authorized WLAN 108 can be stored in a database that is accessible by the verification system 118. In some cases, the database can be stored in a local memory of the verification system 118. The database, for instance, may include multiple entries corresponding to multiple authorized WLANs (e.g., including the first authorized WLAN 102 and the second authorized WLAN 108), multiple coverage areas (e.g., including the first coverage area 104 and the second coverage area 110), multiple times (e.g., different times at which the first WLAN and/or the second authorized WLAN 108 transmit different fingerprints), the fingerprints transmitted by the multiple authorized WLANs, any combination thereof, or the like. In some cases, a primary key of the database corresponds to the coverage areas. Upon determining that a user device (e.g., the first UE 106 or the second UE 112) is in a particular coverage area (e.g., the first coverage area 104 or the second coverage area 110), the verification system 118 may identify an entry of the database corresponding to the coverage area and identify, in the entry, the verified fingerprint that is transmitted throughout that coverage area by the associated WLAN (e.g., the first authorized WLAN 102 or the second authorized WLAN 108). Thus, the verification system 118 can compare the fingerprint received by the user device to the verified fingerprint that is being transmitted through the coverage area, and accurately determine whether the source of the fingerprint received by the user device is the rogue WLAN 114. In some cases, the entry may include multiple fingerprints that are transmitted by the associated WLAN at different times. The verification system 118 can identify the time at which the user device received the fingerprint and identify the appropriate verified fingerprint that is transmitted through the coverage area, in which the user device is located, at the identified time.

According to some implementations, the verification system 118 may identify the verified fingerprints by querying the first authorized WLAN 102 and the second authorized WLAN 108. For instance, upon receiving an indication that a user device (e.g., the first UE 106 or the second UE 112)

has received a fingerprint from an unknown source in a coverage area (e.g., the first coverage area 104 or the second coverage area 110), the verification system 118 may transmit, to the corresponding WLAN (e.g., the first authorized WLAN 102 or the second authorized WLAN 108) a request for the verified fingerprint associated with the coverage area. The corresponding WLAN may transmit a response including the verified fingerprint. Thus, the verification system 118 can identify the verified fingerprint based on the response.

According to some implementations, the verification system 118 may direct the first authorized WLAN 102 and/or the second authorized WLAN 108 to transmit particular fingerprints throughout their respective coverage areas (i.e., the first coverage area 104 and the second coverage areas 110). In some cases, the verification system 118 may further direct the first authorized WLAN 102 and/or the second authorized WLAN 108 to change their verified fingerprints over time. For example, the verification system 118 may transmit fingerprint requests to the first authorized WLAN 102 and the second authorized WLAN 108. The fingerprint requests may indicate the first fingerprint(s) and/or the second fingerprint(s). In response to receiving the fingerprint requests, the first authorized WLAN 102 and the second authorized WLAN 108 may transmit the fingerprints specified in the fingerprint requests. Each fingerprint request may specify a fingerprint or otherwise indicate how the fingerprint is to be identified. For example, a fingerprint request may include a formula that can be used by the first authorized WLAN 102 or the second authorized WLAN 108 to calculate their respective fingerprints at given times. In various cases, both the verification system 118 and the WLANs 102 and 108 may be aware of the verified fingerprints transmitted by the WLANs 102 and 108 at any particular time.

In various examples, the verification system 118 may generate the verified fingerprints. For example, the verification system 118 may generate a random string of symbols that corresponds to each verified fingerprint. In some cases, the verification system 118 can generate each fingerprint using a pseudo-random number generator (PRNG), a cryptographically secure PRNG (CSPRNG), or the like. Each verified fingerprint can include multiple symbols, such as at least four symbols, at least five symbols, at least six symbols, or the like. In some cases, each verified fingerprint can include no more than ten symbols. Each symbol can correspond to a number, a letter, a bit, or the like.

In some cases, the verification system 118 can notify user devices (e.g., the first UE 106 and the second UE 112) that have received advertisement messages from the rogue WLAN 114. In some cases, the user device may have been exchanging wireless data via the rogue WLAN 114. Upon identifying (e.g., based on the notification) that the user device has received an advertisement message from the rogue WLAN 114, the user device may output an indication that the wireless data exchanged with the rogue WLAN 114 may have been successfully attacked or otherwise compromised. For instance, a display of the user device may output a visual alert indicating that data exchanged by the user device and the rogue WLAN 114 may have been exposed to a nefarious party. In some cases, the user device may disconnect from the rogue WLAN 114, or refrain from registering with the rogue WLAN 114, upon identifying that the advertisement message was received from the rogue WLAN 114. Accordingly, the security risk presented by the rogue WLAN 114 can be addressed or avoided.

The environment 100 may further include an administrator system 120, which may be associated with a mobile network that controls the first authorized WLAN 102 and the second authorized WLAN 108. The mobile network may be associated with multiple coverage areas, including the first coverage area 104 and the second coverage area 110. For instance, the mobile network may have a license to use one or more predetermined wireless resources (e.g., frequency bands) within the multiple coverage areas. The license may be granted by a governmental entity, such as the US Federal Communications Commission (FCC). The administrator system 120 can include, or be implemented, by one or more hardware devices. In some cases, the verification system 118 and the verification system 120 may be implemented on the same device(s). The administrator system 120 may be in communication with the verification system 118.

In various implementations, the verification system 118 and/or the administrator system 120 may be configured to identify the location of the rogue WLAN 114. The administrator system 120 may further be configured to cause the rogue WLAN 114 to be decommissioned. In some examples, in response to identifying that one or more user devices have received advertisement messages from the rogue WLAN 114, the verification system 118 may provide a report to the administrator system 120. The report may indicate at least one time and/or at least one location of the user device(s), when they received the advertisement messages from the rogue WLAN 114. Based on the time(s) and/or location(s), the administrator system 120 may be able to triangulate the location of the rogue WLAN 114. In various cases, the report may indicate the coverage areas (e.g., the first coverage area 104 and/or the second coverage area 110) in which the rogue WLAN 114 has broadcasted advertisement messages. Thus, the administrator system 120 may approximate the location of the rogue WLAN 114 based on the coverage areas in which the rogue WLAN 114 is broadcasting advertisement messages. In some cases, the administrator system 120 may notify a governmental authority (e.g., the US FCC, the US Department of Homeland Security, or the like) of the location of the rogue WLAN 114. The governmental authority may take steps to locate the physical transceivers of the rogue WLAN 114 and decommission the rogue WLAN 114. Thus, the problems caused by the rogue WLAN 114 can be resolved.

In some cases, the verification system 118 and/or the administrator system 120 may ensure that the mobile network is not charged for activities of the rogue WLAN 114. For example, the user device (e.g., the first UE 106 or the second UE 112) that has received an advertisement message from the rogue WLAN 114 may provide, to the verification system 118, a Public Land Mobile Network (PLMN) code included in the advertisement message or some other broadcast message received by the user device from the rogue WLAN 114. The verification system 118 may determine that the mobile network is associated with the PLMN code. In various implementations, the verification system 118 may indicate, in the report, that the rogue WLAN 114 is claiming to use the PLMN code associated with the mobile network. Accordingly, the administrator system 120 may dispute or prevent charges to the mobile network due to activities of the rogue WLAN 114.

In particular examples, the first UE 106 may be located in the first coverage area 104 and receive an advertisement message from the first authorized WLAN 102. The advertisement message may include a first fingerprint. The first UE 106 may provide a verification request to the verification system 118 that indicates the first fingerprint, the location of the first UE 106 upon receiving the advertisement message, a wireless band in which the advertisement message was received, and the time at which the advertisement message is received by the first UE 106. The verification system 118 may identify the first coverage area 104 based on the location of the first UE 106. The verification system 118 may identify the first fingerprint that the first authorized WLAN 102 transmits throughout the first coverage area 104, for instance, in an entry of a local database indexed by coverage area. The entry may further indicate that the first authorized WLAN 102 transmits the first fingerprint during the time at which the advertisement message is received by the first UE 106. The verification system 118 may determine that the first fingerprint in the advertisement message matches the first fingerprint transmitted by the first authorized WLAN 102. Thus, the verification system 118 may determine that the source of the advertisement message is the first authorized WLAN 102. The verification system 118 may provide, to the first UE 106, a verification response indicating that the source of the advertisement message is verified. In some cases, the first UE 106 may register with the first authorized WLAN 102 in response to receiving the verification response.

According to some examples, the second UE 112 may be located in the second coverage area 110 and the rogue coverage area 116. The second UE 112 may receive an advertisement message from the rogue WLAN 114. The advertisement message may lack a fingerprint or include an unverified fingerprint. If the advertisement message lacks a fingerprint, the second UE 112 may conclude that the rogue WLAN 114 is unverified and may disconnect from the rogue WLAN 114 or otherwise refrain from exchanging data with the rogue WLAN 114. If the advertisement message includes an unverified fingerprint, then the second UE 112 may provide a verification request to the verification system 118 that indicates the unverified fingerprint, the location of the second UE 112 upon receiving the advertisement message, a wireless band in which the advertisement was received, and the time at which the advertisement message was received by the second UE 112. The verification system 118 may determine that the second UE 112 was in the second coverage area 110 based on the location of the second UE 112. The verification system 118 may identify a second fingerprint that the second authorized WLAN 108 transmits throughout the second coverage area 110, for instance, in an entry of a local database indexed by coverage area. The entry may further indicate that the second authorized WLAN 108 transmits the second fingerprint during the time at which the advertisement message is received by the second UE 112. The verification system 118 may determine that the unverified fingerprint in the advertisement message is different than the second fingerprint transmitted by the second authorized WLAN 108. Thus, the verification system 118 may determine that the source of the advertisement message is not the second authorized WLAN 108, and may be the rogue WLAN 114. The verification system 118 may provide, to the second UE 112, a verification response indicating that the source of the advertisement message is unverified. The second UE 112 may disconnect from the rogue WLAN 114. In some cases, the second UE 112 may output, to a user, an indication that data was exchanged with the rogue WLAN 114 and may be compromised. According to some examples, the second UE 112 may refrain from registering with the rogue WLAN 114.

In some examples, the verification system 118 can provide, to the administrator system 120, a report indicating the rogue WLAN 114. For instance, the report may indicate at least one of the time at which the second UE 112 received the advertisement message from the rogue WLAN 114, the location of the second UE 112 when the advertisement message was received from the rogue WLAN 114, the second coverage area 110 in which the advertisement message was received from the rogue WLAN 114, a wireless band over which the advertisement message was transmitted, a PLMN code indicated in the advertisement message, or the like. The administrator system 120 may estimate the location of the rogue WLAN 114 based, at least in part, on the report. In some cases, the report itself, or other reports received from the verification system 118, provide further information about advertisement messages received by other UEs from the rogue WLAN 114. The administrator system 120 may use the report(s) to identify the location of the rogue WLAN 114. According to various implementations, the administrator system 120 can notify a governmental authority about the rogue WLAN 114. The governmental authority may take steps to decommission the rogue WLAN 114 in response to being notified by the administrator system 120. In some cases, the administrator system 120 can output a report indicating the location of the rogue WLAN 114 to a user.

Figure 2A:
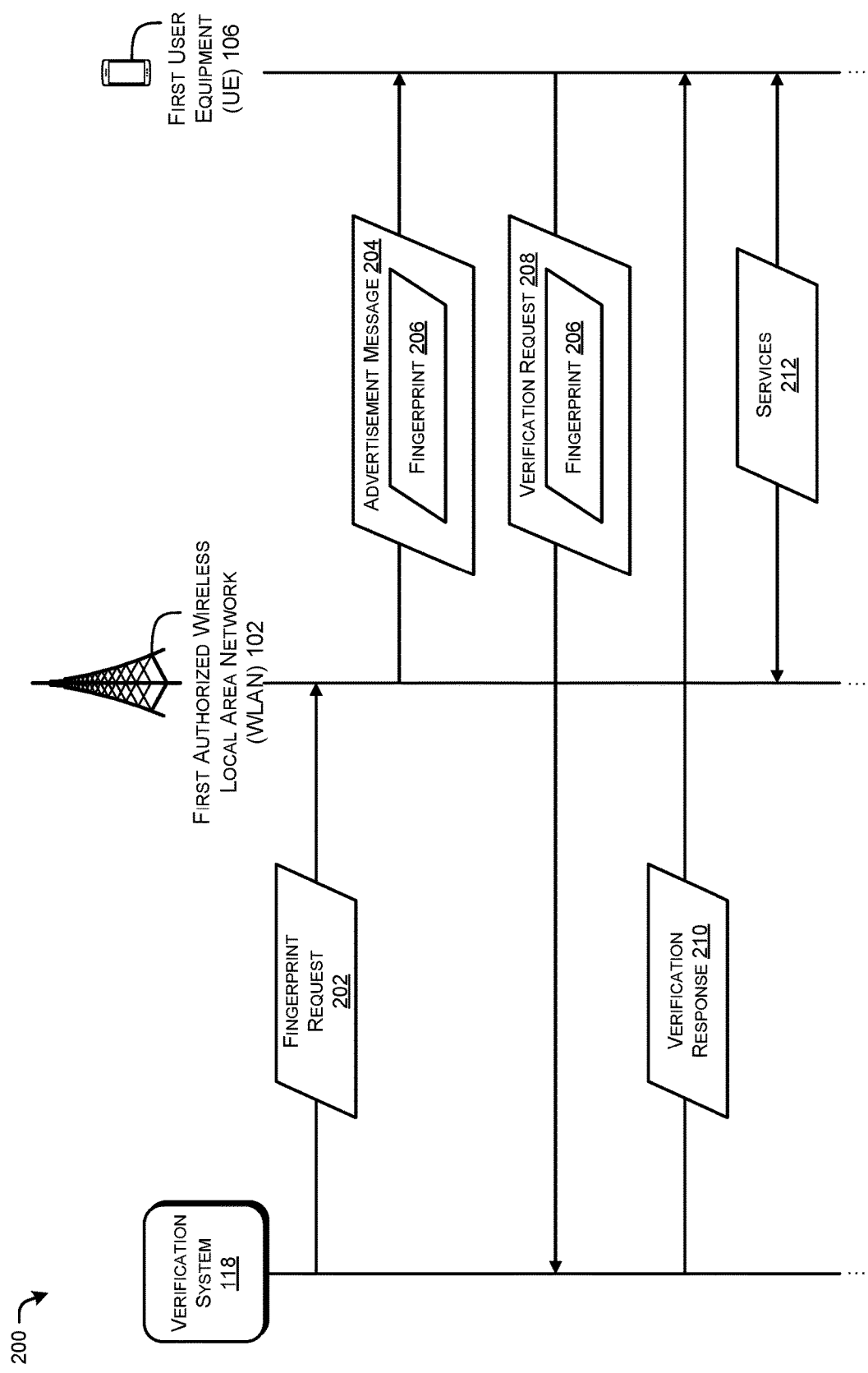
FIGS. 2A and 2B illustrate example signaling for determining whether wireless networks are verified based on fingerprints in advertisement messages.
Figure 2B:
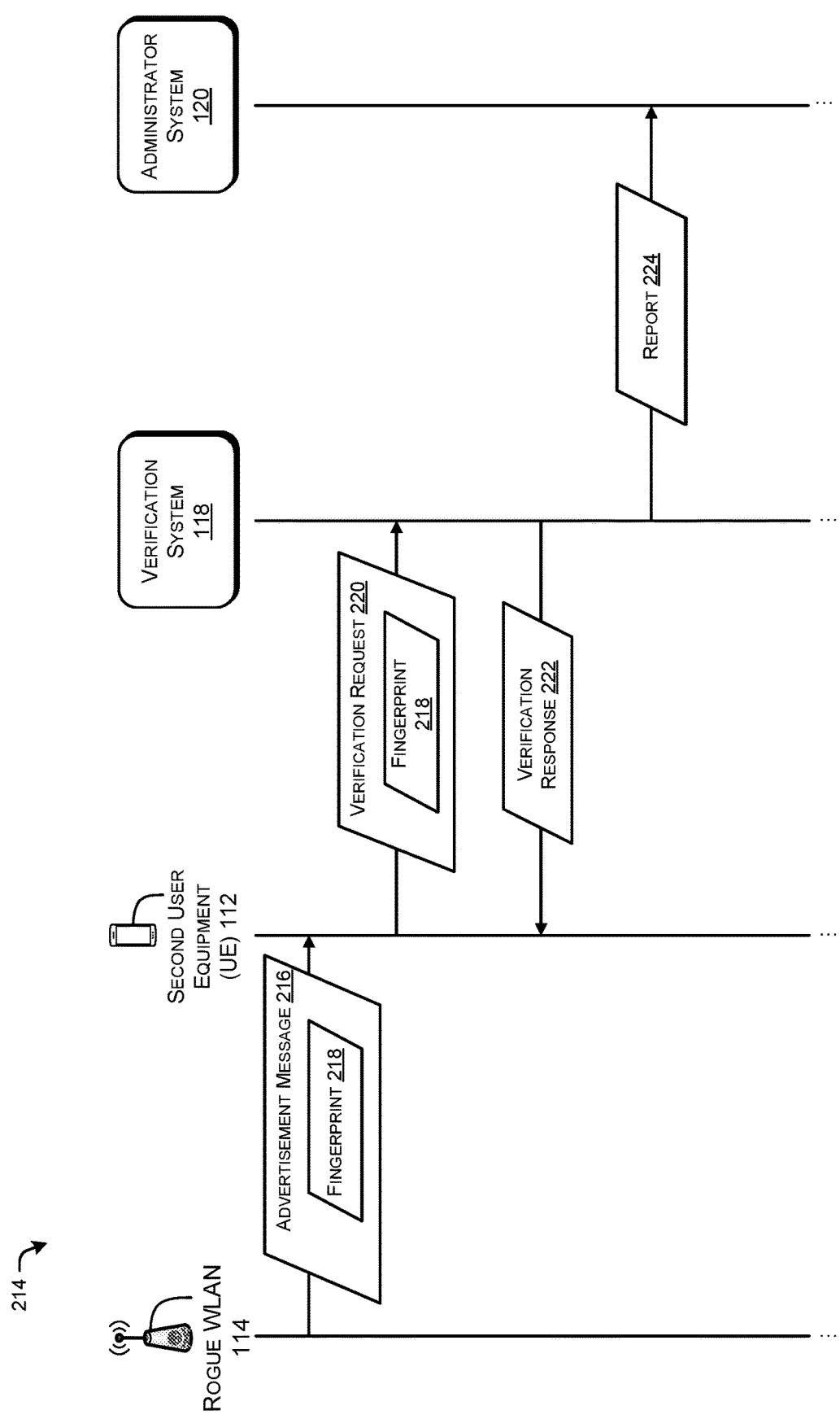

FIGS. 2A and 2B illustrate example signaling for determining whether WLANs are verified based on fingerprints in advertisement messages. FIG. 2A illustrates example signaling 200 for verifying a WLAN. As illustrated, the signaling 200 is between the verification system 118, the first authorized WLAN 102, and the first UE 106, which are described above with reference to FIG. 1. In the example illustrated in FIG. 2A, the verification system 118, the first authorized WLAN 102, and the first UE 106 are separate devices connected by one or more communication networks. However, in some implementations described herein, two or more of the verification system 118, the first authorized WLAN 102, and the first UE 106 can be implemented on the same physical device.

The verification system 118 may transmit a fingerprint request 202 to the first authorized WLAN 102. The fingerprint request 202 may instruct the first authorized WLAN 102 to include one or more fingerprints in advertisement messages of the first authorized WLAN 102. In some cases, the fingerprint request 202 can include the one or more fingerprints. In some implementations, the fingerprint request 202 may indicate how the one or more fingerprints can be derived or calculated by the first authorized WLAN 102. The verification system 118 may generate the fingerprint(s), for instance, using a PRNG. Each fingerprint may include a string of multiple symbols.

In various examples, the fingerprint request 202 indicates multiple fingerprints. The fingerprint request 202 may further indicate that the multiple fingerprints are to be transmitted at different times. For example, the fingerprint request 202 may indicate that the first authorized WLAN 102 is to include a first fingerprint in advertisement messages transmitted during a first time and to include a second fingerprint in advertisement messages transmitted during a second time. The first and second fingerprints may be different than each other. Further, the first time period and the second time period may be non-overlapping time periods.

The first authorized WLAN 102 may transmit an advertisement message 204 to the first UE 106. The advertisement message 204 may include, for instance, a beacon, a broadcast control channel (BCCH) message, a system information broadcast, or the like. In various cases, the first authorized WLAN 102 may broadcast the advertisement message 204 throughout a coverage area of the first authorized WLAN 102.

In various examples, the advertisement message 204 may include a fingerprint 206. The fingerprint 206 may be indicated by the fingerprint request 202. In various implementations, the fingerprint 206 is encoded within the advertisement message 204. In some cases, the fingerprint 206 may be included in one or more data fields of a frame body of the advertisement message 204, in one or more parameters of a system information block (SIB), in one or more parameters of a system information broadcast, or the like. The advertisement message 204 may be transmitted wirelessly from the first authorized WLAN 102 to the first UE 106, which may be located in the coverage area of the first authorized WLAN 102.

The first UE 106 may transmit a verification request 208 to the verification system 118. The verification request 208 may include the fingerprint 206. In various cases, the first UE 106 may transmit the verification request 208 over one or more communication networks connecting the first UE 106 to the verification system 118. In some cases, the verification request 208 can be transmitted over a connection established with the first authorized WLAN 102. In various cases, the verification request 208 can be transmitted over some other wired and/or wireless network that excludes the first authorized WLAN 102. The verification request 208 may further specify at least one of a time at which the advertisement message 204 was received by the first UE 106, a wireless band in which the advertisement message 204 was transmitted, a location of the first UE 106 upon receiving the advertisement message 204, or the like.

Upon receiving the verification request 208, the verification system 118 may compare the fingerprint 206 to a fingerprint that is transmitted by an authorized WLAN in the coverage area in which the first UE 106 is located. The verification system 118 may compare the location of the first UE 106 to a map of multiple coverage areas, thereby identifying the coverage area in which the first UE 106 was located. In some cases, the verification system 118 may identify the coverage area among coverage areas that are associated with WLANs transmitting messages using the wireless band specified in the verification request 208. The verification system 118 can identify the fingerprint transmitted by the authorized WLAN, which is the first authorized WLAN 102, during the time specified by the verification request 208. According to various cases, the verification system 118 can read the fingerprint transmitted by the authorized WLAN from an entry of a database. In the example illustrated in FIG. 2A, the verification system 118 can confirm that the fingerprint 206 matches the fingerprint that the authorized WLAN transmitted during the time. The verification system 118 may transmit a verification response 210 to the first UE 106, which may indicate that the source of the advertisement message 204 is an authorized WLAN.

The first authorized WLAN 102 and the first UE 106 may exchange services 212. The services 212 may include wireless data. For instance, the services 212 may include voice services, data services, or the like. In some cases, the first UE 106 may refrain from exchanging the services 212 until the verification response 210 is received by the first UE 106. In various examples, the first UE 106 may register with the first authorized WLAN 102 upon receiving the verification response 210.

FIG. 2B illustrates example signaling 214 for detecting an unauthorized WLAN. As illustrated, the signaling 214 is between the rogue WLAN 114, the second UE 112, the verification system 118, and the administrator system 120, which are described above with reference to FIG. 1. In the example illustrated in FIG. 2B, the second UE 112, the verification system 118, and the administrator system 120 are separate devices connected by one or more communication networks. However, in some implementations described herein, two or more of the second UE 112, the verification system 118, and the administrator system 120 can be implemented on the same physical device.

The rogue WLAN 114 may transmit an advertisement message 216 to the second UE 112. The advertisement message 216 may be wirelessly transmitted to the second UE 112 via a wireless band. The advertisement message 216 may include a fingerprint 218. In some cases, the fingerprint 218 may be a previous fingerprint utilized in advertisement messages from an authorized WLAN whose coverage area overlaps the rogue WLAN 114. The authorized WLAN may also transmit data wirelessly via the wireless band.

The second UE 112 may transmit a verification request 220 to the verification system 118. The verification request 220 may include the fingerprint 218. In various cases, the second UE 112 may transmit the verification request 220 over one or more communication networks connecting the second UE 112 to the verification system 118. In some cases, the verification request 220 can be transmitted over a connection established with the rogue WLAN 114. In various cases, the verification request 220 can be transmitted over some other wired and/or wireless network that excludes the rogue WLAN 114. The verification request 208 may further specify at least one of a time at which the advertisement message 216 was received by the second UE 112, a wireless band in which the advertisement message 216 was transmitted, a location of the second UE 112 upon receiving the advertisement message 216, or the like.

Upon receiving the verification request 220, the verification system 118 may compare the fingerprint 218 to a fingerprint that is transmitted by an authorized WLAN in the coverage area in which the second UE 112 was located when the second UE 112 received the advertisement message 216. The verification system 118 may compare the location of the second UE 112 to a map of multiple coverage areas, thereby identifying the coverage area in which the second UE 112 was located. In some cases, the verification system 118 may identify the coverage area among coverage areas that are associated with WLANs transmitting messages using the wireless band specified in the verification request 220. The verification system 118 can identify the fingerprint transmitted by the authorized WLAN during the time specified by the verification request 220. According to various cases, the verification system 118 can read the fingerprint transmitted by the authorized WLAN from an entry of a database. In the example illustrated in FIG. 2B, the verification system 118 can determine that the fingerprint 218 is different than the fingerprint that the authorized WLAN transmitted during the time. The verification system 118 may transmit a verification response 222 to the second UE 112, which may indicate that the source of the advertisement message 204 is an unauthorized WLAN.

In various examples, the second UE 112 may take one or more actions upon receiving the verification response 222. In some cases, the second UE 112 may disconnect from the rogue WLAN 114 and refrain from exchanging data wirelessly with the rogue WLAN 114. In some instances, the second UE 112 may output, to a user, an indication that the second UE 112 was at least temporarily connected to the rogue WLAN 114. The indication may further specify data that was exchanged with the rogue WLAN 114, which may be compromised.

The verification system 116 may also transmit a report 224 to the administrator system 120. The report 224 may indicate one or more details about the rogue WLAN 114, the second UE 112, and/or the encounter between the rogue WLAN 114 and the second UE 112. For example, the report 224 may indicate the time at which the advertisement message 216 was transmitted, the wireless band over which the advertisement message 216 was transmitted, the coverage area in which the second UE 112 was located when it received the advertisement message 216, the location of the second UE 112 when it received the advertisement message 216, or the like. Accordingly, the administrator system 120 can take action to locate and neutralize the rogue WLAN 114.

Figure 3A:
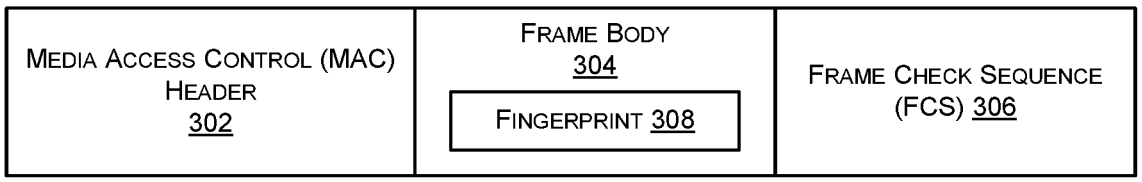
FIGS. 3A to 3C illustrate examples of various advertisement messages described herein.
Figure 3B:
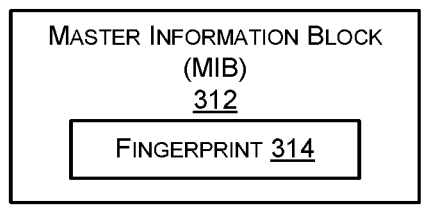
Figure 3C:
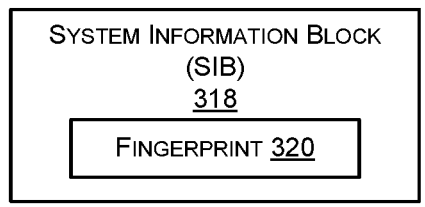

FIGS. 3A to 3C illustrate examples of various advertisement messages described herein. FIG. 3A illustrates a first example of an advertisement message, which may be a beacon 300. The beacon 300 may be included in an advertisement message transmitted by an AP, for instance. The beacon 300 includes a media access control (MAC) header 302, a frame body 304, and a frame check sequence (FCS) 306. A fingerprint 308 may be included in the frame body 304. For instance, the fingerprint 308 can be included in a data field of the frame body 304. In various examples, the fingerprint 308 may include one or more symbols.

FIG. 3B illustrates a second example of an advertisement message, which may be a broadcast channel (BCH) message 310. The BCH message 310 may be included in an advertisement message transmitted by a cellular base station, for instance. The BCCH message 310 may include a master information block (MIB) 312. A fingerprint 314 may be included in the MIB 312. For instance, the fingerprint 314 can be included in one or more parameters of the MIB 312.

FIG. 3C illustrates a third example of an advertisement message, which may be a downlink shared channel (DL-SCH) message 316. Alternatively, in some instances, the advertisement message can be a control channel message. The DL-SCH message 316 may be included in an advertisement message transmitted by a cellular base station, for instance. The DL-SCH message 316 illustrated in FIG. 3C may include a system information block (SIB) 318. In various cases, the SIB 318 can include a fingerprint 320. For instance, the fingerprint 320 can be included in one or more parameters of the SIB 318.

Figure 4:
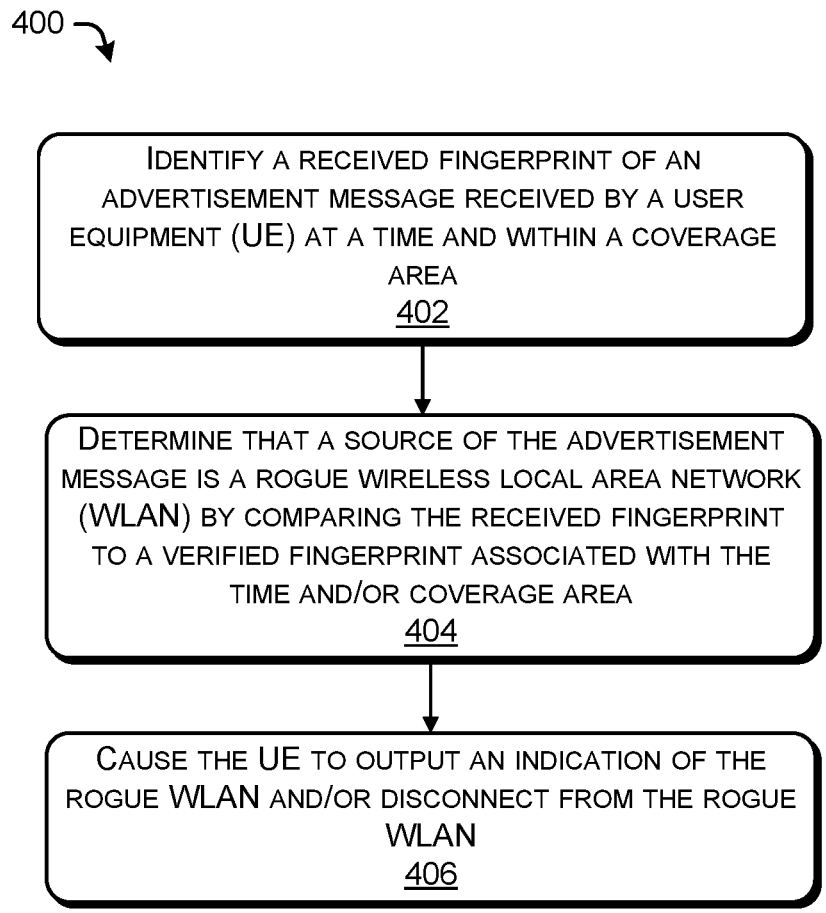
FIG. 4 illustrates an example process for verifying a WLAN based on a fingerprint.

FIG. 4 illustrates an example process 400 for verifying a WLAN based on a fingerprint. The process 400 can be performed by at least one of a UE (e.g., the first UE 106 or the second UE 112) or the verification system 118, described above with reference to FIG. 1.

At 402, the process 400 may include identifying a received fingerprint of an advertisement message received by a UE at a time and within a coverage area. In some cases, 402 may include receiving the advertisement message. In some examples, 402 may include receiving a verification request from the UE that indicates the received fingerprint. In some cases, the verification request may further indicate the time and a location of the UE when the advertisement message was received. For example, the location may be identified based on GPS functionality of the UE. The fingerprint may include one or more symbols. The fingerprint may be included in a data field of the advertisement message or may be otherwise encoded within the advertisement message. In some cases, the verification request may include At 404, the process 400 may include determining that a source of the advertisement message is a rogue WLAN by comparing the received fingerprint to a verified fingerprint associated with the time and/or coverage area. In various cases, the verified fingerprint may be a rotated fingerprint that changes over time. According to various implementations, the verified fingerprint may be transmitted by an authorized WLAN during the time and in a coverage area that overlaps the location of the UE when the advertisement message was received. In some instances, the coverage area can be identified by comparing the location of the UE to a map of various coverage areas associated with a mobile network.

In some cases, the verified fingerprint can be retrieved from a database. For instance, the database may include multiple entries corresponding to different times and/or coverage areas associated with a mobile network. The entries may further store indications of verified fingerprints. An entry corresponding to the coverage area and/or the time can be identified, and the verified fingerprint can be read from the entry. In some cases, the entity performing the process 400 may direct the authorized WLAN to transmit the verified fingerprint. For example, the entity may generate the verified fingerprint, store the verified fingerprint in the database, and request the authorized WLAN to transmit the verified fingerprint during the time. In some cases, the entity performing the process 400 may identify the authorized WLAN based on the coverage area, transmit a request for the verified fingerprint to the authorized WLAN, and the authorized WLAN may return an indication of the verified fingerprint.

At 406, the process 400 may include causing the UE to output an indication of the rogue WLAN and/or disconnect from the rogue WLAN. For example, a verification response may be transmitted to the UE which indicates that the UE has connected to a rogue WLAN. In some cases, the UE may output an alert on a user interface of the UE that indicates that the UE was connected to the rogue WLAN. For example, a time period in which the UE exchanged data with the rogue WLAN may be identified (e.g., by the UE itself). Further, data exchanged with the rogue WLAN (e.g., e-mails, application data, voice data, or the like) can be identified. The alert may indicate the time period and/or the data. For example, the alert may indicate that one or more voice calls were performed via the connection with the rogue WLAN, and may have been compromised. In some implementations, the UE may disconnect from the rogue WLAN in response to receiving the verification response.

In some implementations, additional functions may be performed. For example, the entity performing the process 400 may further communicate, with an administrator system (e.g., the administrator system 120) the location of the UE when the UE received the advertisement message and/or the coverage area in which the UE received the advertisement message. In some cases, the time at which the advertisement message was received may be further indicated to the administrator system. According to some implementations, additional details regarding advertisement messages received by different UEs, different times, and in different coverage areas may be further communicated to the administrator system. Accordingly, the administrator system may identify the location of the rogue WLAN. For example, multiple locations of UEs that received advertisement messages from a rogue WLAN in neighboring coverage areas may be used to triangulate the location of the rogue WLAN. In some cases, the administrator system may notify an authority (e.g., a governmental entity) of the rogue WLAN, and the authority may decommission the rogue WLAN.

Figure 5:
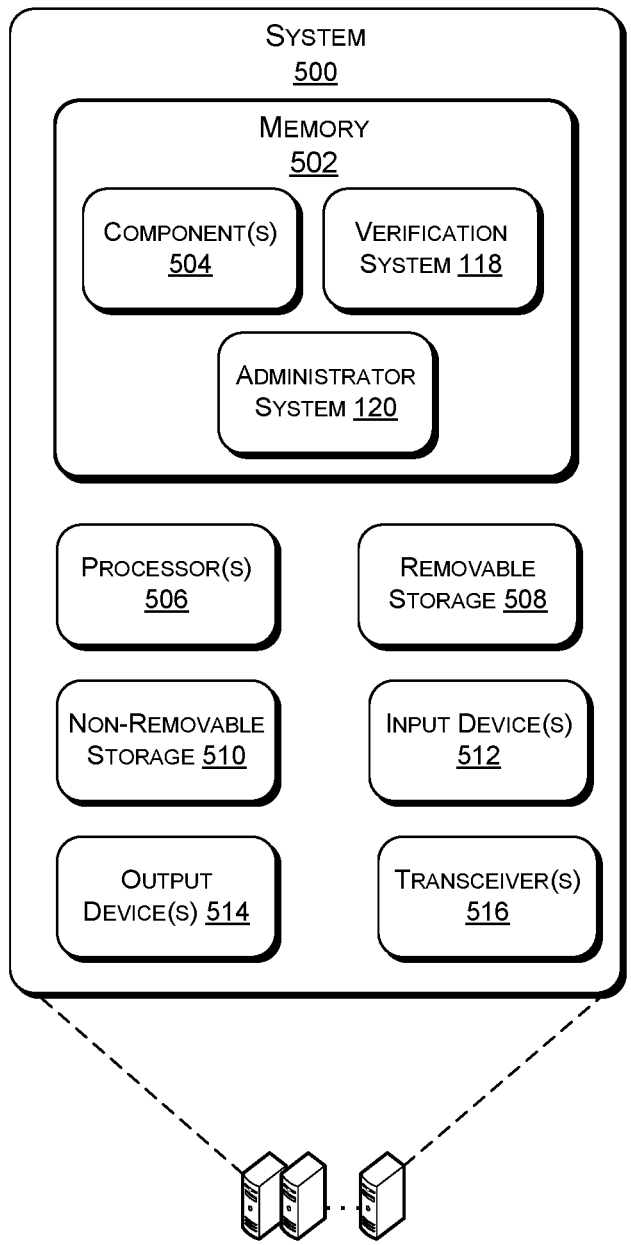
FIG. 5 illustrates an example system, which may be configured to perform any of the functions described herein.

FIG. 5 illustrates an example system 500, which may be configured to perform any of the functions described herein. Although the system 500 is illustrated as one or more servers, in some cases, the system 500 can be implemented in a UE and/or a WLAN.

The system 500 may include memory 502. The memory 502 may store component(s) 504. The component(s) 518 may include at least one of instruction(s), program(s), database(s), software, operating system(s), etc. In some implementations, the component(s) 518 include instructions that are executed by processor(s) 506 and/or other components of the system 500. As illustrated, the memory 502 may further store the verification system 118 and the administrator system 120, which are described in further detail above. In some cases, the verification system 118 or the administrator system 120 can be omitted from the system 500. In some cases, the memory 502 may further include a database that stores various entries including verified fingerprints associated with a mobile network.

In some embodiments, the processor(s) 506 include a central processing unit (CPU), a graphics processing unit (GPU), or both CPU and GPU, or other processing unit or component known in the art. The processor(s) 506 may be configured to execute instructions included in the component(s) 504, verification system 118, and/or administrator system 120, thereby performing various operations described herein.

The system 500 may also include additional data storage devices (removable and/or non-removable) such as, for example, magnetic disks, optical disks, or tape. Such additional storage is illustrated in FIG. 5 by removable storage 508 and non-removable storage 510. Tangible computer-readable media can include volatile and non-volatile, removable and non-removable media implemented in any method or technology for storage of information, such as computer readable instructions, data structures, program modules, or other data. The memory 502, the removable storage 508, and the non-removable storage 510 are all examples of computer-readable storage media. Computer-readable storage media include, but are not limited to, Random Access Memory (RAM), Read-Only Memory (ROM), Electrically Erasable Programmable Read-Only Memory (EEPROM), flash memory, or other memory technology, Compact Disk Read-Only Memory (CD-ROM), Digital Versatile Discs (DVDs), Content-Addressable Memory (CAM), or other optical storage, magnetic cassettes, magnetic tape, magnetic disk storage or other magnetic storage devices, or any other medium which can be used to store the desired information and which can be accessed by the system 500. Any such tangible computer-readable media can be part of the system 500.

The system 500 may be configured to communicate over a telecommunications network using any common wireless and/or wired network access technology. Moreover, the system 500 may be configured to run any compatible device Operating System (OS).

The system 500 also can include input device(s) 512, such as a keypad, a cursor control, a touch-sensitive display, voice input device, etc., and output device(s) 514 such as a display, speakers, printers, etc. These devices are well known in the art and need not be discussed at length here.

As illustrated in FIG. 5, the system 500 also includes one or more wired or wireless transceiver(s) 516. For example, the transceiver(s) 516 can include a network interface card (NIC), a network adapter, a local area network (LAN) adapter, or a physical, virtual, or logical address to connect to various network components, for example. To increase throughput when exchanging wireless data, the transceiver(s) 216 can utilize multiple-input/multiple-output (MIMO) technology. The transceiver(s) 516 can comprise any sort of wireless transceivers capable of engaging in wireless, radio frequency (RF) communication. The transceiver(s) 516 can also include other wireless modems, such as a modem for engaging in Wi-Fi, WiMAX, Bluetooth, infrared communication, and the like. The transceiver(s) 516 may include transmitter(s), receiver(s), or both.

According to various implementations of the present disclosure, the system 500 can be included in a core network (e.g., an EPC, a 5GC, or some other type of core network), an IMS network, or the like. For example, the system 500 may be included in a mobility management entity (MME), a home subscriber server (HSS), or some other component of an EPC. In some instances, the system 500 may be included in an access and mobility management function (AMF), a session management function (SMF), a user plane function (UPF), an authentication server function (AUSF), a united data management (UDM), or some other component of a 5GC. In some implementations, the system 500 may be included in one or more devices (e.g., servers) connected to a core network and/or IMS network via the Internet or some other wide area communication network. For instance, the device 500 may be included in one or more application servers that are connected to a core network vie the Internet.

CONCLUSION

Although the subject matter has been described in language specific to structural features and/or methodological acts, it is to be understood that the subject matter described in this disclosure is not necessarily limited to any of the specific features or acts described. Rather, the specific features and acts are disclosed as examples and embodiments of the present disclosure.

What is claimed is:

1. A verification system comprising:

at least one processor; and memory storing instructions that, when executed by the at least one processor, cause the verification system to perform operations comprising:

transmitting, to a first authorized wireless local area network (WLAN) associated with a first coverage area, a first fingerprint request to transmit one or more first advertisement messages during a first time, the one or more first advertisement messages including a first verified fingerprint;

transmitting, to the first authorized WLAN, a second fingerprint request to transmit one or more second advertisement messages during a second time, the one or more second advertisement messages including a second verified fingerprint, the second verified fingerprint being different than the first verified fingerprint;

transmitting, to a second authorized WLAN associated with a second coverage area, a third fingerprint request to transmit one or more third advertisement messages during the first time, the one or more third advertisement messages including a third verified fingerprint, the third verified fingerprint being different than the first verified fingerprint and the second verified fingerprint, wherein at least one of the one or more first advertisement messages, the one or more second advertisement messages, or the one or more third advertisement messages comprise at least one of a beacon, a master information block (MIB), or a system information block (SIB);

receiving, from a user equipment (UE), a verification request indicating a received fingerprint comprised in a fourth advertisement message, the fourth advertisement message being received by the UE during the first time and within at least one of the first coverage area or the second coverage area, the UE being utilized to request fingerprint verification by the verification system via the verification request;
identifying that a time at which the fourth advertisement message is received is the first time;
based at least in part on the identifying that the time at which the fourth advertisement message is received is the first time, identifying the first time from among the first time and the second time for verifying a source of the fourth advertisement message;
based at least in part on the identifying of the first time for the verifying of the source of the fourth advertisement message, determining that the source of the fourth advertisement message is a rogue WLAN by determining that the received fingerprint is different than the first verified fingerprint; and
causing the UE to output an alert indicating data that the UE exchanged with the rogue WLAN by transmitting, to the UE, a verification response indicating that the source of the fourth advertisement message is the rogue WLAN.

2. The verification system of claim 1, wherein the operations further comprise:
transmitting, to an administrator system, a report indicating a presence of the rogue WLAN and a location of the UE at the first time.

3. A method, comprising:
transmitting, to a first authorized wireless local area network (WLAN) associated with a first coverage area, a first fingerprint request to transmit one or more first advertisement messages during a first time, the one or more first advertisement messages including a first verified fingerprint;
transmitting, to the first authorized WLAN, a second fingerprint request to transmit one or more second advertisement messages during a second time, the one or more second advertisement messages including a second verified fingerprint, the second verified fingerprint being different than the first verified fingerprint;
transmitting, to a second authorized WLAN associated a second coverage area, a third fingerprint request to transmit one or more third advertisement messages during the first time, the one or more third advertisement messages including a third verified fingerprint, the third verified fingerprint being different than the first verified fingerprint and the second verified fingerprint, wherein at least one of the one or more first advertisement messages, the one or more second advertisement messages, or the one or more third advertisement messages comprise at least one of a beacon, a master information block (MIB), or a system information block (SIB);
identifying, based at least in part on, a verification request, a received fingerprint comprised in a fourth advertisement message that is received by a user equipment (UE) at a first time and within at least one of the first coverage area or the second coverage area, the UE being utilized to request fingerprint verification by a verification system via the verification request;
identifying that a time at which the fourth advertisement message is received is the first time;
based at least in part on the identifying that the time at which the fourth advertisement message is received is the first time, identifying the first time from among the first time and a second time for verifying a source of the fourth advertisement message;
based at least in part on the identifying of the first time for the verifying of the source of the fourth advertisement message, determining that the source of the fourth advertisement message is a rogue wireless local area network (WLAN) by determining that the received fingerprint is different than a verified fingerprint transmitted by an authorized WLAN at the first time and in the coverage area; and
causing the UE to output alert indicating the rogue WLAN.

4. The method of claim 3, wherein identifying the received fingerprint comprises:
receiving, from the UE, the verification request indicating the received fingerprint, the time, and a location of the UE at the time, and
wherein the method further comprises identifying the at least one of the first coverage area or the second coverage area based on the location of the UE at the time.

5. The method of claim 3, further comprising:
identifying the verified fingerprint by reading the verified fingerprint from an entry of a database, the entry being associated with at least one of the first coverage area or the second coverage area.

6. The method of claim 3, further comprising:
identifying the verified fingerprint by transmitting, to the authorized WLAN, a request for the verified fingerprint; and
receiving, from the authorized WLAN, a response indicating the verified fingerprint.

7. The method of claim 3, wherein the alert indicates at least one of the second time at which the UE exchanged data with the rogue WLAN or the data.

8. The method of claim 3, further comprising:
causing the UE to disconnect from the rogue WLAN.

9. The method of claim 3, further comprising:
transmitting, to an administrator system associated with a mobile network that comprises the authorized WLAN, a report indicating a location of the UE at the time.

10. A system, comprising:
at least one processor; and
memory storing instructions that, when executed by the at least one processor, cause the system to perform operations comprising:
transmitting, to a first authorized wireless local area network (WLAN) associated with a first coverage area, a first fingerprint request to transmit one or more first advertisement messages during a first time, the one or more first advertisement messages including a first verified fingerprint;
transmitting, to the first authorized WLAN, a second fingerprint request to transmit one or more second advertisement messages during a second time, the one or more second advertisement messages including a second verified fingerprint, the second verified fingerprint being different than the first verified fingerprint;
transmitting, to a second authorized WLAN associated a second coverage area, a third fingerprint request to transmit one or more third advertisement messages during the first time, the one or more third advertisement messages including a third verified fingerprint, the third verified fingerprint being different than the first verified fingerprint and the second verified fingerprint, wherein at least one of the one or more first advertisement messages, the one or more second advertisement messages, or the one or more third advertisement messages comprise at least one of a beacon, a master information block (MIB), or a system information block (SIB);

identifying, based at least in part on, a verification request, a received fingerprint comprised in a fourth advertisement message that is received by a user equipment (UE) at a first time and within at least one of the first coverage area or the second coverage area, the UE being utilized to request fingerprint verification by a verification system via the verification request;

identifying that a time at which the fourth advertisement message is received is the first time;

based at least in part on the identifying that the time at which the fourth advertisement message is received is the first time, identifying the first time from among the first time and a second time for verifying a source of the fourth advertisement message;

based at least in part on the identifying of the first time for the verifying of the source of the fourth advertisement message, determining that the source of the fourth advertisement message is a rogue wireless local area network (WLAN) by determining that the received fingerprint is different than a verified fingerprint transmitted by an authorized WLAN at the first time and in the coverage area; and causing the UE to disconnect from the rogue WLAN.

11. The system of claim 10, wherein identifying the received fingerprint comprises:
receiving, from the UE, the verification request indicating the received fingerprint, the time, and a location of the UE at the time, and
wherein the operations further comprise identifying at least one of the first coverage area or the second coverage area based on the location of the UE at the time.

12. The system of claim 10, wherein the operations further comprise:
identifying the verified fingerprint by reading the verified fingerprint from an entry of a database, the entry being associated with at least one of the first coverage area or the second coverage area.

13. The system of claim 10, wherein the operations further comprise:
identifying the verified fingerprint by transmitting, to the authorized WLAN, a request for the verified fingerprint; and
receiving, from the authorized WLAN, a response indicating the verified fingerprint.

14. The system of claim 10, wherein causing the UE to disconnect from the rogue WLAN comprises causing the UE to output, via a user interface, at least one of an indication of the second time at which the UE exchanged data with the rogue WLAN or an indication of the data.

15. The system of claim 10, wherein the operations further comprise: transmitting, to an administrator system associated with a mobile network that comprises the authorized WLAN, a report indicating a location of the UE at the time.

* * * * *